United States Patent
Kondo et al.

(10) Patent No.: US 8,332,077 B2
(45) Date of Patent: Dec. 11, 2012

(54) CONTROLLER AND CONTROL METHOD FOR A WIND FARM INCLUDING A PLURALITY OF WIND TURBINE GENERATORS

(75) Inventors: Shinichi Kondo, Hitachi (JP); Yasunori Ono, Mito (JP); Noriyuki Uchiyama, Hitachinaka (JP); Masaya Ichinose, Hitachiota (JP); Mitsugu Matsutake, Hitachi (JP); Takashi Aihara, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 522 days.

(21) Appl. No.: 12/570,169

(22) Filed: Sep. 30, 2009

(65) Prior Publication Data
US 2010/0078940 A1    Apr. 1, 2010

(30) Foreign Application Priority Data
Sep. 30, 2008    (JP) .................... 2008-252056

(51) Int. Cl.
*G05D 5/00* (2006.01)
*G05D 9/00* (2006.01)
*G05D 11/00* (2006.01)

(52) U.S. Cl. ........ 700/287; 700/295; 700/297; 700/293; 290/44

(58) Field of Classification Search .............. 700/286, 700/287, 295, 297, 293; 290/44, 55, 54
See application file for complete search history.

(56) References Cited

U.S. PATENT DOCUMENTS

| | | | | |
|---|---|---|---|---|
| 4,285,481 A * | 8/1981 | Biscomb | ............. | 244/33 |
| 5,155,375 A * | 10/1992 | Holley | ............. | 290/44 |
| 5,422,826 A * | 6/1995 | Cousineau | ............. | 700/287 |
| 6,338,009 B1 * | 1/2002 | Sato et al. | ............. | 700/286 |
| 6,420,795 B1 * | 7/2002 | Mikhail et al. | ............. | 290/55 |
| 6,850,821 B2 * | 2/2005 | Weitkamp | ............. | 700/286 |
| 6,858,953 B2 * | 2/2005 | Stahlkopf | ............. | 290/55 |
| 6,933,625 B2 * | 8/2005 | Feddersen et al. | ............. | 290/55 |

(Continued)

FOREIGN PATENT DOCUMENTS

JP    2001-234845    8/2001

(Continued)

OTHER PUBLICATIONS

Chen, Z. and Spooner, E., "Grid Power Quality with Variable Speed Wind Turbines", Jun. 2001, IEEE Transactions on Energy Conservation, vol. 16, Iss. 2, pp. 148-154.*

(Continued)

*Primary Examiner* — Mohammad Ali
*Assistant Examiner* — Kelvin Booker
(74) *Attorney, Agent, or Firm* — Antonelli, Terry, Stout & Kraus, LLP.

(57) ABSTRACT

In a controller for a windfarm including a plurality of wind turbine generators controllable in rotation frequency and pith of blades of the wind turbine generators, coupled to a grid through a transmission line, an anemometer is provided to each wind turbine generator to transmits wind direction and wind speed data to a central controller which process the wind direction and wind speed data to transmit an output command each wind turbine generator. The central controller predicts, on the basis of the wind speed detected by the upstream wind turbine generator, variation in wind speed at other wind turbine generators to control the output of the windfarm. The output power may be limited or charging energy as rotation energy of blades and discharging the rotation energy as output power in addition to a battery unit for averaging.

19 Claims, 11 Drawing Sheets

U.S. PATENT DOCUMENTS

| | | | |
|---|---|---|---|
| 6,975,925 B1* | 12/2005 | Barnes et al. | 700/286 |
| 7,002,260 B2* | 2/2006 | Stahlkopf | 290/55 |
| 7,015,595 B2* | 3/2006 | Feddersen et al. | 290/55 |
| 7,042,110 B2* | 5/2006 | Mikhail et al. | 290/44 |
| 7,099,800 B2* | 8/2006 | Henriksen et al. | 700/286 |
| 7,199,482 B2* | 4/2007 | Hopewell | 290/44 |
| 7,227,275 B2* | 6/2007 | Hennessy et al. | 290/55 |
| 7,298,059 B2* | 11/2007 | Delmerico et al. | 307/85 |
| 7,317,260 B2* | 1/2008 | Wilson | 290/44 |
| 7,318,154 B2* | 1/2008 | Tehee, Jr. | 713/155 |
| 7,339,355 B2* | 3/2008 | Erdman et al. | 290/44 |
| 7,346,462 B2* | 3/2008 | Delmerico | 702/60 |
| 7,392,114 B2* | 6/2008 | Wobben | 700/286 |
| 7,432,611 B2* | 10/2008 | Stahlkopf | 290/44 |
| 7,432,686 B2* | 10/2008 | Erdman et al. | 322/44 |
| 7,476,985 B2* | 1/2009 | Llorente Gonzalez | 290/44 |
| 7,509,190 B2* | 3/2009 | Emery et al. | 700/291 |
| 7,514,907 B2* | 4/2009 | Rajda et al. | 323/205 |
| 7,528,496 B2* | 5/2009 | Fortmann | 290/44 |
| 7,535,120 B2* | 5/2009 | Erdman et al. | 307/47 |
| 7,603,202 B2* | 10/2009 | Weitkamp | 700/287 |
| 7,606,638 B2* | 10/2009 | Fortmann et al. | 700/287 |
| 7,613,548 B2* | 11/2009 | Cardinal et al. | 700/286 |
| 7,622,816 B2* | 11/2009 | Stahlkopf | 290/55 |
| 7,761,190 B2* | 7/2010 | Delmerico et al. | 700/297 |
| 7,839,024 B2* | 11/2010 | Cardinal et al. | 307/84 |
| 7,840,312 B2* | 11/2010 | Altemark et al. | 700/286 |
| 7,902,689 B2* | 3/2011 | Kinzie et al. | 290/55 |
| 7,945,350 B2* | 5/2011 | Kinzie et al. | 700/280 |
| 7,949,434 B2* | 5/2011 | Jurkat | 700/287 |
| 7,994,658 B2* | 8/2011 | Cardinal et al. | 307/84 |
| 7,999,406 B2* | 8/2011 | Cardinal et al. | 290/55 |
| 8,000,840 B2* | 8/2011 | Nielsen | 700/286 |
| 8,032,614 B2* | 10/2011 | Riesberg et al. | 700/286 |
| 8,039,979 B2* | 10/2011 | Yasugi | 290/55 |
| 8,041,465 B2* | 10/2011 | Larsen et al. | 700/287 |
| 8,046,110 B2* | 10/2011 | Mayor et al. | 700/297 |
| 8,108,079 B2* | 1/2012 | Wobben | 700/286 |
| 2002/0029097 A1* | 3/2002 | Pionzio et al. | 700/286 |
| 2003/0127862 A1* | 7/2003 | Weitkamp | 290/44 |
| 2004/0026929 A1* | 2/2004 | Rebsdorf et al. | 290/44 |
| 2005/0165511 A1* | 7/2005 | Fairlie | 700/286 |
| 2005/0188745 A1* | 9/2005 | Staphanos et al. | 700/287 |
| 2006/0087124 A1* | 4/2006 | Stahlkopf | 290/44 |
| 2006/0273595 A1* | 12/2006 | Avagliano et al. | 290/44 |
| 2007/0001461 A1* | 1/2007 | Hopewell | 290/44 |
| 2007/0124025 A1* | 5/2007 | Schram et al. | 700/287 |
| 2007/0132247 A1* | 6/2007 | Galayda et al. | 290/44 |
| 2007/0173982 A1* | 7/2007 | Cardinal et al. | 700/286 |
| 2009/0060740 A1* | 3/2009 | Stiesdal et al. | 290/44 |
| 2009/0146435 A1* | 6/2009 | Freda | 290/55 |
| 2009/0160187 A1* | 6/2009 | Scholte-Wassink | 700/287 |
| 2009/0184519 A1* | 7/2009 | Nies et al. | 290/44 |
| 2009/0218818 A1* | 9/2009 | Cardinal et al. | 290/44 |
| 2009/0230681 A1* | 9/2009 | Scholte-Wassink | 290/44 |
| 2009/0281820 A1* | 11/2009 | Sarkar et al. | 705/1 |
| 2010/0150718 A1* | 6/2010 | Freda | 416/120 |
| 2010/0270798 A1* | 10/2010 | Poulsen et al. | 290/44 |
| 2010/0274401 A1* | 10/2010 | Kjaer et al. | 700/287 |
| 2011/0004356 A1* | 1/2011 | Garcia | 700/287 |
| 2011/0046803 A1* | 2/2011 | Kondo et al. | 700/287 |
| 2011/0115224 A1* | 5/2011 | Lausen | 290/44 |
| 2011/0148114 A1* | 6/2011 | Garcia | 290/44 |
| 2011/0175356 A1* | 7/2011 | Nielsen et al. | 290/44 |

FOREIGN PATENT DOCUMENTS

| | | |
|---|---|---|
| JP | 2002-027679 | 1/2002 |
| JP | 2002-349413 | 12/2002 |
| JP | 2004-289896 | 10/2004 |
| JP | 2004-301116 | 10/2004 |
| JP | 2006-022792 | 1/2006 |

OTHER PUBLICATIONS

European Communities, "ENERGIE", 2001, Deutsches Windenergie-Institut GmbH, Tech-wise A/S, DM Energy.*

Hansen, A.D., Sorensen, P., Blaabjerg, F. and Becho, J., "Dynamic Modelling of Wind Farm Grid Interaction", 2002, Wind Engineering, vol. 26, No. 4, pp. 191-208.*

Kanellos, F.D. and Hatziargyriou, N.D., "The Effect of Variable-Speed Wind Turbines on the Operation of Weak Distribution Networks", Dec. 2002, IEEE Transactions on Energy Conservation, vol. 17, No. 4.*

* cited by examiner

CONTROLLER AND CONTROL METHOD FOR A WIND FARM INCLUDING A PLURALITY OF WIND TURBINE GENERATORS

CROSS REFERENCE TO RELATED APPLICATIONS

This application claims the foreign priority benefit under Title 35, United States Code, §119(a)-(d) of Japanese Patent Application No. 2008-252056, filed on Sep. 30, 2008 in the Japan Patent Office, the disclosure of which is herein incorporated by reference in its entirety.

BACKGROUND OF THE INVENTION

1. Field of the Invention

The present invention relates to a controller and a control method for a windfarm including a plurality of wind turbine generators for generating electric power from wind to supply the power to a grid.

2. Description of the Related Art

A controller and a control method for a windfarm including a plurality of wind turbine generators for generating electric power from wind to supply the power to a grid are known.

JP 2002-349413 A discloses a controller for controlling one of wind turbine generators in a windfarm. The controller communicates with the other controllers in the windfarm through a communication unit. In the windfarm, a target power generation quantity is set. Each controller exchanges maintenance data and operation characteristic data with other controllers and determines an operation pattern of the wind turbine generator to make a total power generation quantity close to the target power generation quantity.

JP 2001-234845A discloses a controller for a windfarm including a plurality of wind turbine generators, wherein the controller selects one of the wind turbine generators showing a large output fluctuation and controls the selected wind turbine generator to efficiently suppress output power fluctuation in a total output power by a pitch control or a rotational speed control to change a maximum value of the power curve.

JP 2002-27679A discloses a wind turbine generator connected with a battery, in which deviation of the generated power from a set reference generation power is adjusted by charging and discharging the battery.

JP 2004-301116 A discloses a wind turbine generator system having a laser anemometer. A wind velocity is observed and on the basis of the observation, a yaw angle or a pitch angle is controlled through prediction.

SUMMARY OF THE INVENTION

An aspect of the present invention provides a controller for a windfarm including a plurality of wind turbine generators controllable in rotation frequency and pith of blades of the wind turbine generators, coupled to a grid through a transmission line, comprising: anemometers at the wind turbine generators configured to measure wind directions and wind speeds thereat; local controllers at the wind turbine generators configured to receive and transmit operation information including the data wind directions and wind speeds through a communication network and control the wind turbine generators, respectively; and a central controller configured to receive the operation information from the local controllers through the network, compute variation in output power of the wind turbine generates on the basis of the received operation information, and generate and transmit to the local controllers output commends to control the wind turbine generators on the basis of a result of the computed variation.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing embodiments of the present invention, the above-mentioned related art will be further explained.

Wind turbine generators have been increasingly introduced into a grid. Because the wind turbine generators largely fluctuate in output power depending on weather condition, maintaining the grid voltage and frequency largely concerns us in further introducing the window turbine generators.

Electric power companies have controlled the grid voltage and frequency by combination of various power sources mainly against variation in demanded power to achieve a balance. When a large number of wind turbine generators are coupled to the grid, this corresponds to that a negative load is added to the conventional demand. Accordingly, depending on a combination of fluctuation in demand and a generated power, a higher adjusting ability may be required.

A fluctuation in demand is considered as a variation where various variations with small amplitude variations, a pulsation component with a given period, and irregular variations are superimposed on each other. These components are classified into three main components, i.e., a small variation of which cycle is up to a several minutes, short period variations, long period variations of which periods are around ten minutes. Similarly, an output of the power generated by the wind turbine includes such three components.

A small fluctuation in demand of which period is up to several minutes can be adjusted by a governor-free operation using an adjustor in a power plant. A short period fluctuation in demand of which period is from several minutes to over ten minutes can be adjusted by detecting a frequency deviation or the like and varying a power generation output in a frequency adjusting power generation plant. This is called a load frequency control (LFC). In a case of a long period fluctuation of which period is longer than that of the short period fluctuation, adjustment is carried out by sending a generation power command to each power plant in consideration of economical efficiency. This is called an economical distribution control (ELD).

In a case where a large number of wind turbine generators are introduced, the load frequency control (LFC) is particularly important. If a fluctuation in wind turbine generation output is superimposed on a fluctuation in demand, a capacity of the frequency adjusting power plant may become insufficient. However, simply increase the capacity of the power plant will result in a big economical load, so that any other replacement method may be required.

As described in JP 2002-349413 A and JP 2001-234845A, suppression of the fluctuation in the output power has been studied by limiting a maximum value of the power curve. The fluctuation of the output power can be suppressed to some extent. However, when a wind speed rapidly decreases, decrease in the output power is avoidable, so that fluctuation in the output power may occur. As a result, an adverse effect may occur such as voltage fluctuation and frequency fluctuation in power sources in a thermal power plant and a nuclear power plant and loads (consumer).

In the wind turbine generator connected with the battery disclosed in JP 2002-27679A, fluctuation may be suppressed by adequately charging and discharging the battery. However, such a wind generator may be costly.

In the wind turbine generator system having a laser anemometer disclosed by JP 2004-301116 A, a reachable range of the Doppler laser is limited. Thus, if an area of the windfarm is large, the system may become costly.

The present invention provides a controller and a control method for a windfarm including a plurality of wind turbine generators capable of suppressing fluctuation of output power to a grid to keep an output power of the windfarm constant. Particularly, a short period fluctuation from several minutes to over ten minutes can be made constant.

Will be described a controller and a control method for a windfarm.

Figure 1:
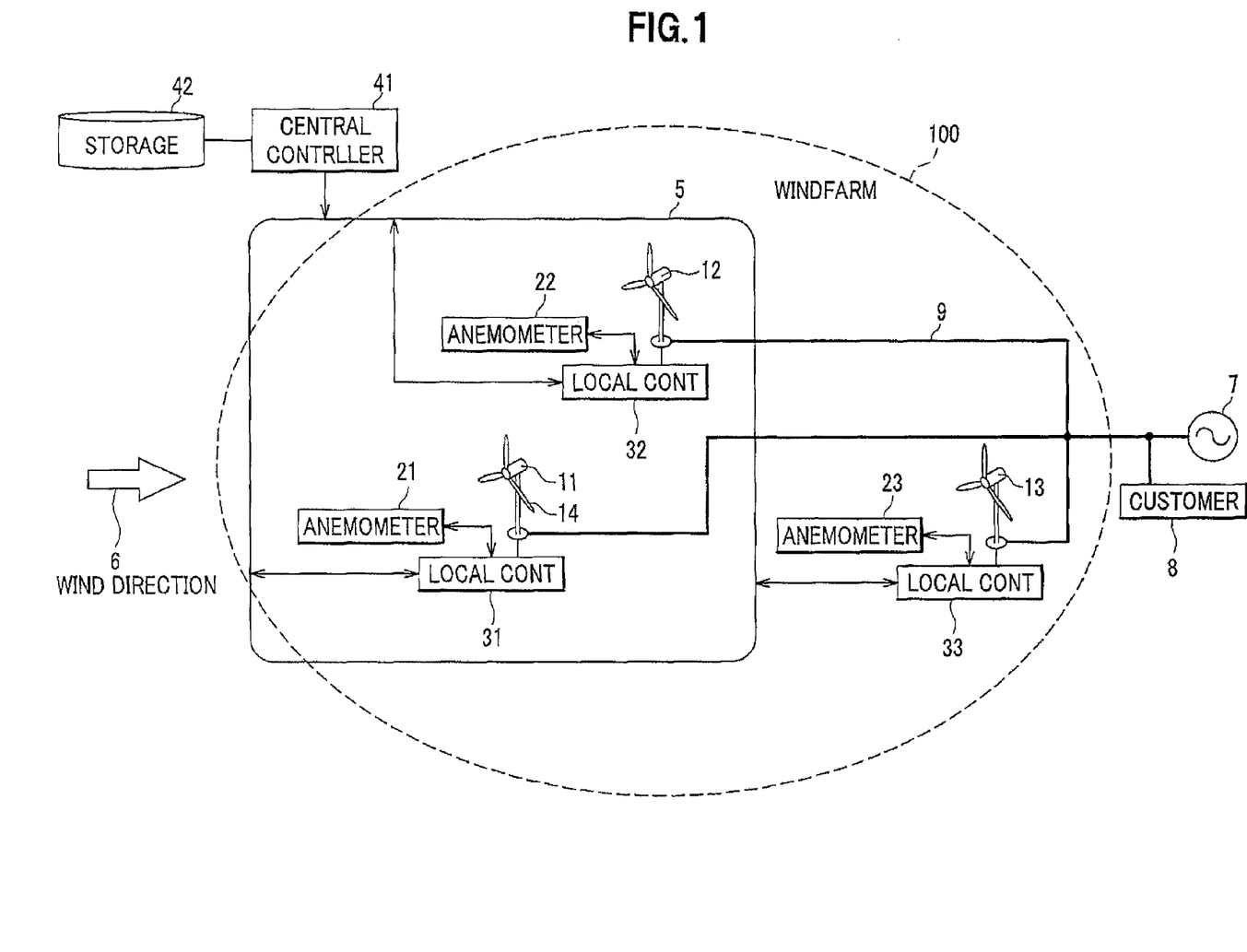
FIG. 1 is a block diagram of a windfarm including a controller according to first to third embodiments of the present invention.

FIG. 1 is a block diagram of a windfarm including a controller according to first to third embodiments of the present invention. A windfarm 100 is coupled to a grid 7 at one terminal, and a customer 8 is supplied with power from the grid 7 and the windfarm 100.

The windfarm 100 includes a plurality of wind turbine generators 11, 12, and 13 capable of variable rotation frequency control and variable pitch control, anemometers 21, 22, and 23, local controller 31, 32, and 33, a central controller 41, and a storage 42. Each of the wind turbine generators 11, 12, and 13 is couple to the grid 7 through transmission lines 9. The wind turbine generators 11, 12, and 13 are coupled to the anemometers 21, 22, and 23, and local controller 31, 32, and 33, respectively. The local controller 31, 32, and 33 are coupled to each other through a communication network 5 and to the central controller 41. The storage 42 is coupled to the central controller 41 and stores output characteristic data, location data, and the like of each of the wind turbine generators 11, 12, and 13.

FIG. 1 also shows a positional relation among the wind turbine generators 11, 12, and 13 and a direction of wind. When wind blows in a direction indicated by an arrow 6 (wind direction 6), one of the wind turbine generators 11, 12, and 13 at which variation in wind velocity first arrive is the wind turbine generator 11. The local controller 31 of the wind turbine generator 11 transmits wind velocity data, i.e., data of wind direction (wind direction data) and wind speed (wind speed data) measured by the anemometer 21 to the central controller 41 through the communication network 5. Similarly, wind direction data and wind speed data measured by the anemometers 22 and 23 of other local controllers 32 and 33 is transmitted to the central controller 41 through the communication network 5. The central controller 41 judges and determines from the received wind direction data that the wind turbine generator 11 is in the most upstream position, and estimates time period for which the variation in the wind speed arrives at other wind turbine generators 12 and 13 (predicts arrival time at wind turbine generators 12 and 13).

Figure 2A:
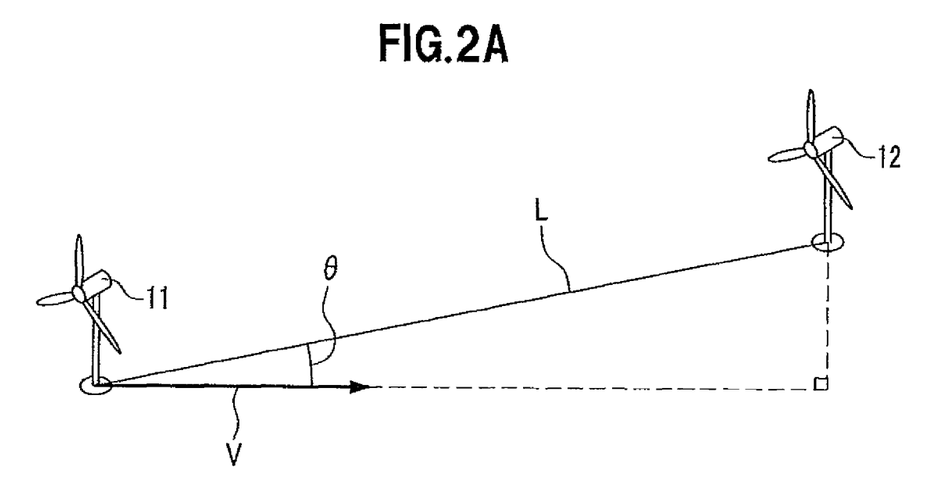
FIG. 2A is an illustration for illustrating a method of predicting a time period until the variation in wind velocity reaches each wind turbine generator according to the first to fourth embodiments of the present invention.
Figure 2B:
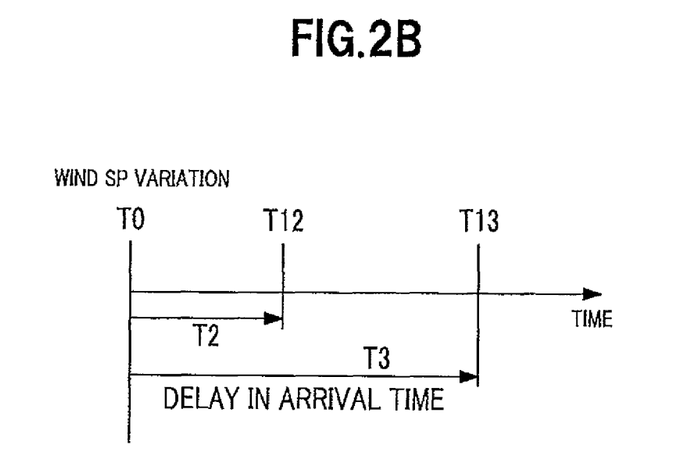
FIG. 2B is a chart for illustrating a delay in arrival time at each wind turbine generator according to the first to fourth embodiments of the present invention.

FIGS. 2A and 2B illustrate a method of estimating a time period until the variation in wind velocity reaches each wind turbine generator to predict variation in the wind speed and wind direction at each of the wind turbine generator. FIG. 2A shows a positional relation between wind turbine generators and the wind direction. FIG. 2B illustrates a delay in arrival time of variation in wind velocity at each wind turbine generator. In FIG. 1, the wind turbine generator 11 at which the variation in wind velocity first arrives is regarded as a reference point, and a distance L and a direction θ to the turbine generator 12 are previously stored in the storage 42 as known data. Delay time T2 from when the wind turbine generator 11 detects variation in the wind speed at T0 to when the variation arrives at the wind turbine generator 12 at time T12 is given by Eq. (1), where V is wind velocity (wind speed). Similarly, delay time T3 from when the wind turbine generator 11 detects the variation in the wind velocity to when the variation arrives at the wind turbine generator 13 at time T13 is calculated.

$$T_2 = \frac{L\cos\theta}{V} \quad (1)$$

Figure 4A:
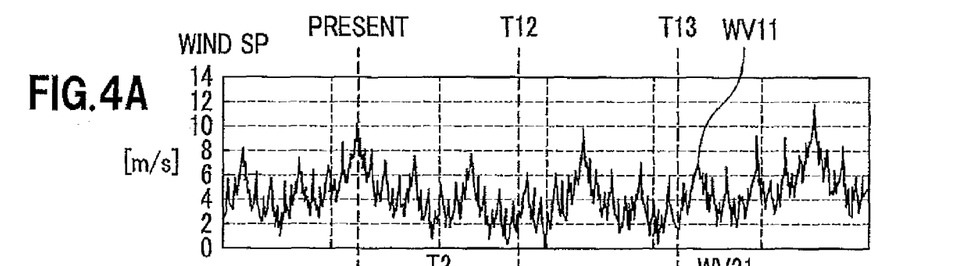
FIGS. 4A to 4C are charts of prediction results in wind velocity variation at each wind turbine generator according to the first to fourth embodiment of the present invention.
Figure 4B:
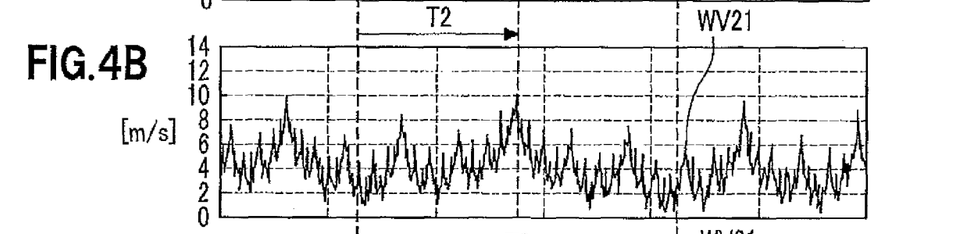
Figure 4C:
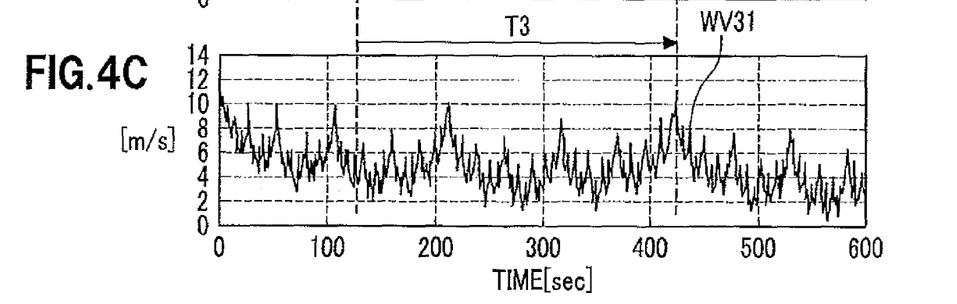

FIG. 4A shows wind speed measurement results WV11 at the wind turbine generator 11. FIG. 4B shows prediction wind speeds WV21 at the wind turbine generator 12 when the time period T2 has passed. Similarly, FIG. 4C shows prediction wind speeds WV31 at the wind turbine generator 13 when the time period T3 has passed.

If it is assumed that the measurement is made at "PRESENT" in FIG. 4A, a part of a waveform WV11 in FIG. 4A on the left side of "PRESENT" has been measured. The part of a waveform WV11 in FIG. 4A on the right side of "PRESENT" will be measured. In FIG. 4B, the wind speed at the wind turbine generator 12 has been predicted at a part of a waveform WV21 on the left side of Time T12 at time of "PRESENT". The part of a waveform WV11 in FIG. 4B on the right side of time T12 will be predicted. Further, in FIG. 4C, the wind speed at the wind turbine generator 13 has been predicted at a part of a waveform WV31 on the left side of Time T13 at time of "PRESENT". The part of a waveform WV11 in FIG. 4C on the right side of time T13 will be predicted.

Figure 5:
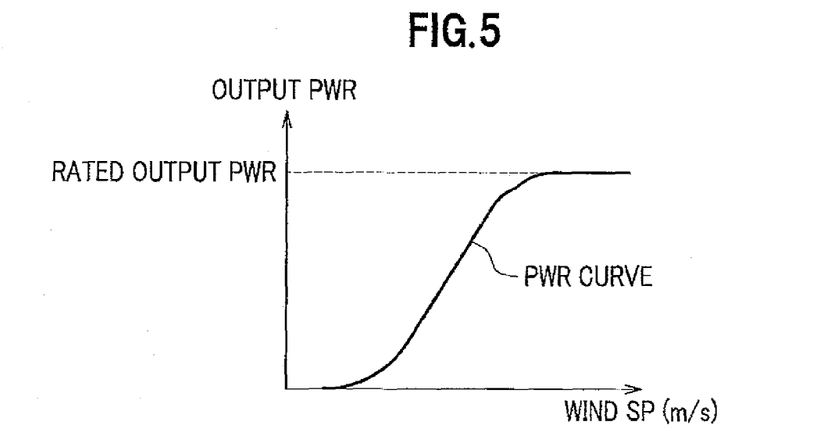
FIG. 5 is a characteristic chart showing a relation between a wind speed and an output power of the wind turbine generator according to the first to fourth embodiments of the present invention.

FIG. 5 shows a power curve showing a relation between a wind speed and an output power of the wind turbine generator (characteristic data representing the relation). The characteristic data is stored in the storage 42 and read out when prediction values for the windfarm 100 are calculated. If the windfarm 100 includes wind turbines having different output characteristics, all of the output characteristics are stored in the storage 42 for prediction calculation.

[First Embodiment]

Figure 6A:
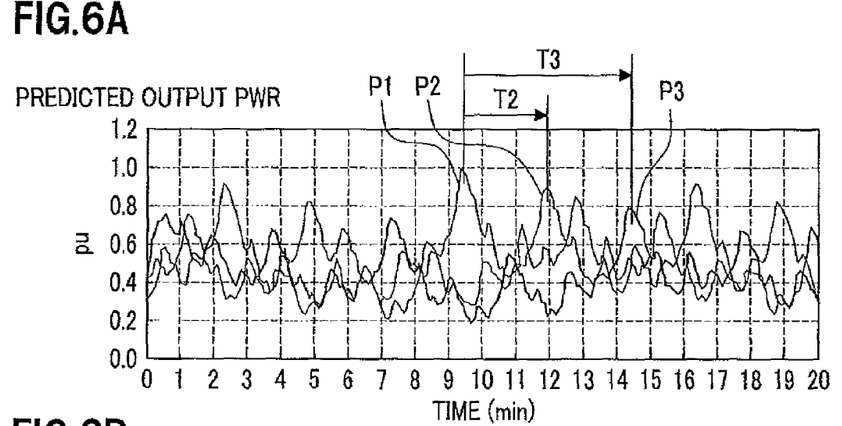
FIGS. 6A and 6B are charts showing prediction results of each wind turbine generator and a total output power of the windfarm according to the first to fourth embodiments of the present invention.
Figure 6B:
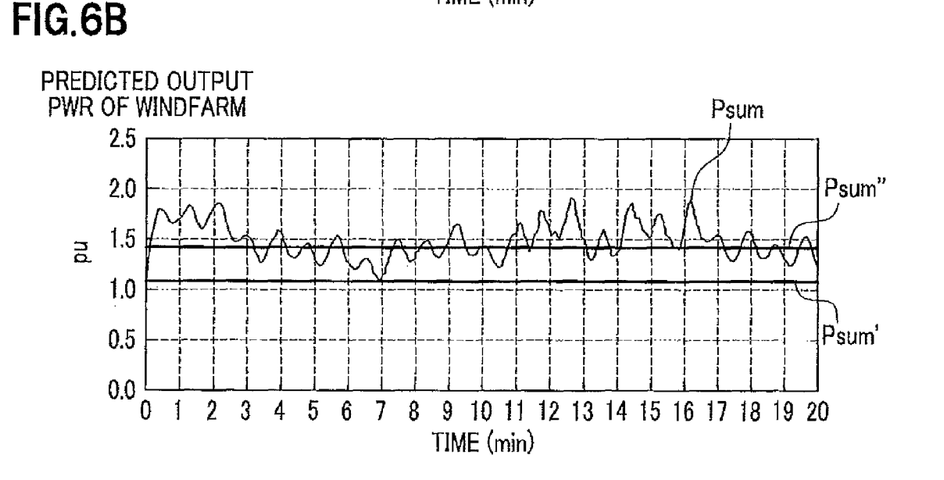

FIGS. 6A and 6B show prediction results of wind turbine generators and a total output power of the windfarm 100, respectively. More specifically, FIG. 6A shows that a measurement output power at the wind turbine 11 which will be measured and output powers of the wind turbine generators predicted from the measurement wind speed. P1 is (a curve of) the measurement output power at the wind turbine 11, and P2 is (a curve of) the predicted output power of the wind turbine generator 12 with the delay time T2 and previous values, and P3 is a curve the predicted output power of the wind turbine generator 13 with the delay time T3 and previous values.

Figure 7:
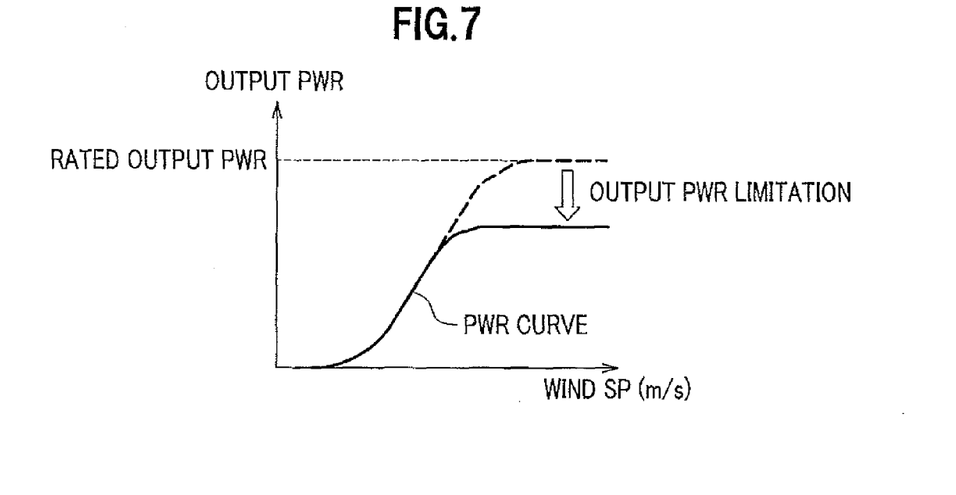
FIG. 7 is a chart showing an operation of changing a power curve of the wind turbine generator by limiting an output power according to the first embodiment of the present invention.

FIG. 6B shows variation in a predicted total output power of the windfarm 100 Psum which is a total of the (curves of) output powers P1, P2, and P3 at respective time. On the basis of a variation range of Psum, an output power is calculated for a stable control at a constant value. Psum' is minimum of the predicted total output power within a predetermined time period (in FIG. 5, twenty minutes) which is a target rage of the constant value control. When this value Psum' is set for the constant value control as a target value, the output command for each wind turbine generator is generated for an output limiting control with Psum' shown in FIG. 6B. The power curve is limited to the minimum value Psum' as shown in FIG. 7 where a maximum power is decreased from a rated output power.

Figure 8A:
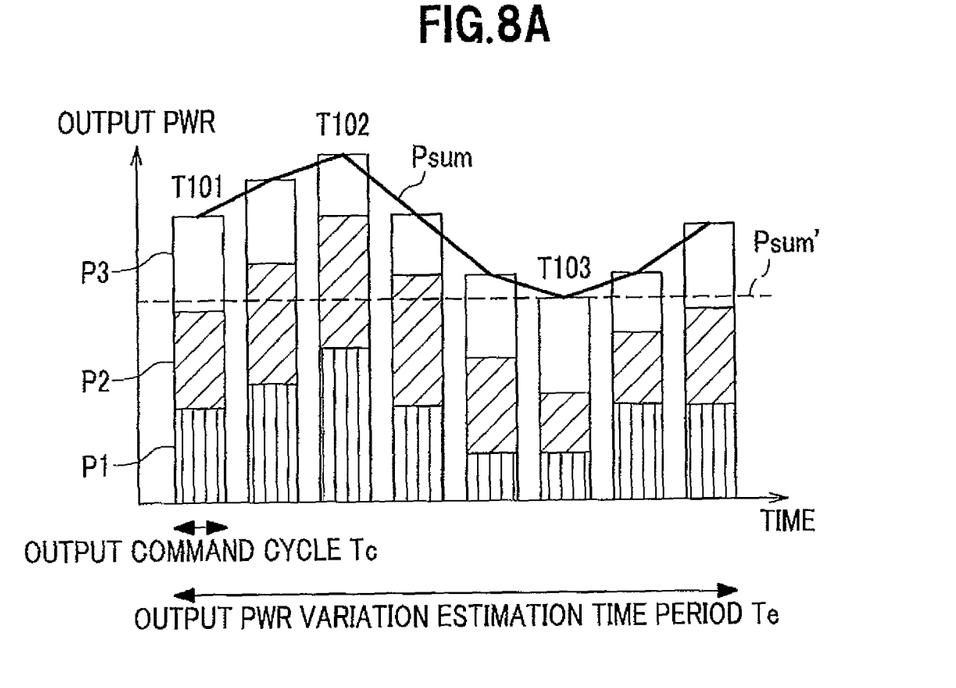
FIGS. 8A and 8B are charts for illustrating an operation of keeping a windfarm output constant by limiting the power curve of the wind turbine generator according to the first embodiment of the present invention.
Figure 8B:
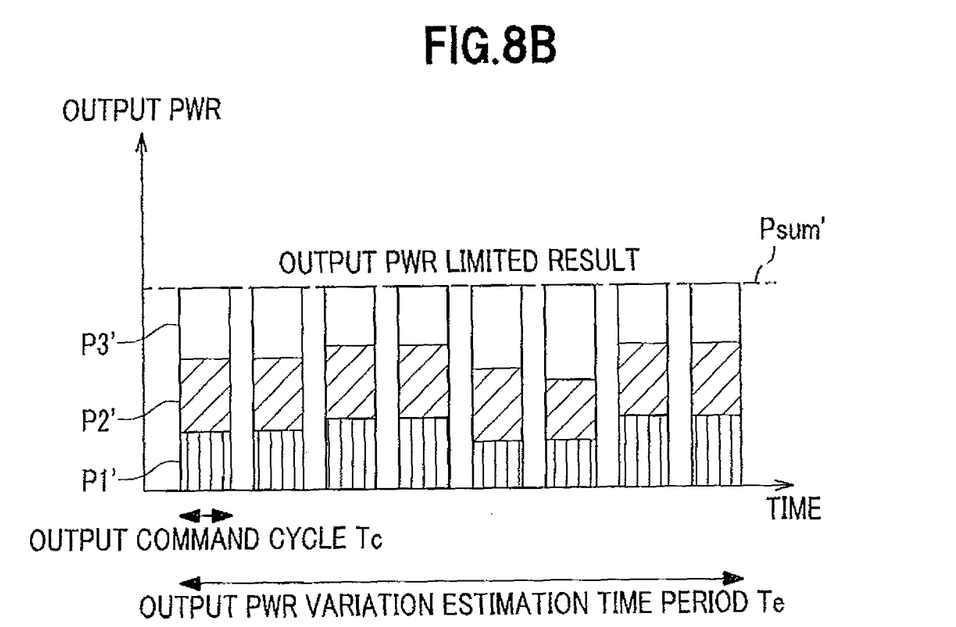

FIGS. 8A and 8B illustrate an operation of keeping a windfarm output constant by limiting the power curve of the wind turbine generator. More specifically, FIG. 8A show the output power P1 which will be measured, and the predicted output powers P2 and P3, and the predicted output power Psum (=P1+P2+P3) of the windfarm 100 for an output variation estimation period Te. FIG. 8B shows an output limiting control result when the output limiting control is carried out with the minimum value Psum' of the predicted output power. Tc is a cycle of output power limitation command.

In FIG. 8A, will be described a method of setting control commands at respective time T101, T102, and T103.

At time T101, P1+P2+P3>Psum', and P1+P2<Psum'. In this case, the control commands are determined that P1'=P2'=P3' and P1'+P2'+P3'=Psum' at an output command cycle Tc. When P1'<P1, P2'<P2, and P3'<P3, one of the wind turbine generators 11 to 13 with a reserve capacity bears the lack of output power.

At time T102, P1+P2>Psum'. In this case, the control commands are determined such that P1'=P2'=P3' and P1'+P2'+P3'=Psum'. To maintain the output power, it is possible that P3'=0. However, avoiding stopping one wind turbine generator provides averaging in operation of the wind turbine generator within the windfarm, which results in averaging degradation of the wind turbine generators 11 to 13 with advantage in a maintenance cost.

At time T103, P1+P2+P3=Psum'. In this case, the output commands are unchanged, i.e., determined such that P1'=P1, P2'=P2, and P3'=P3.

Figure 3A:
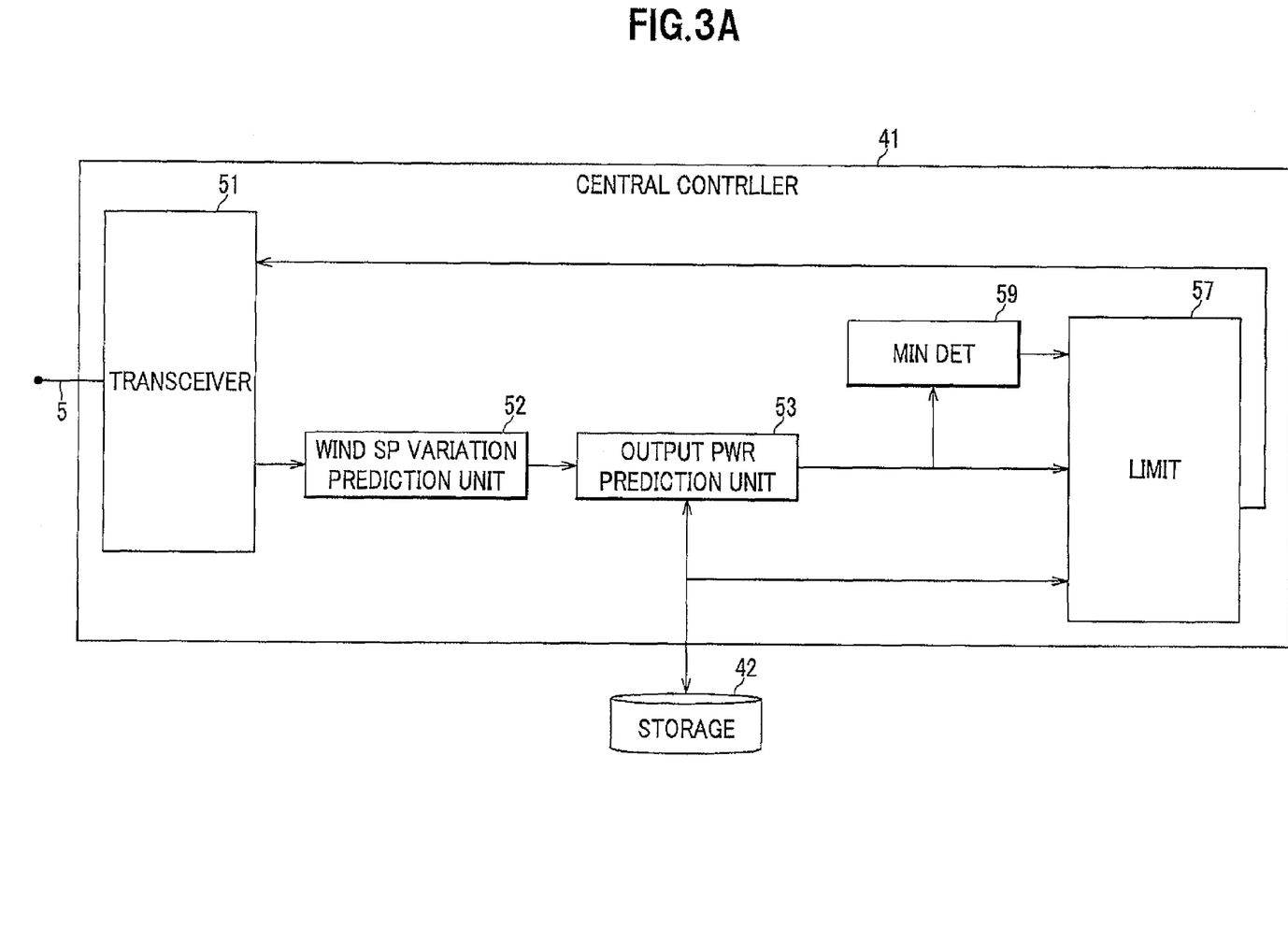
FIG. 3A is a block diagram of a central controller according to the first embodiment of the present invention.

FIG. 3A is a block diagram of the central controller 41 according to the first embodiment of the present invention. The central controller 41 includes a transceiver 51 coupled to the communication network 5 for receiving the wind direction data, the wind speed data, and output data from the wind turbine generators 11 to 13 and transmitting commands to the wind turbine generators 11 to 13, a wind speed variation prediction unit 52 for receiving the wind direction data and the wind speed data and estimating (predicting) near future wind velocities within the windfarm 100 from the wind direction data and the wind speed data; an output power prediction unit 53 for receiving the wind direction data and the wind speed data and predicting (estimating) near future wind output power, a minimum detector 59 for detecting a minimum value of the predicted output power Psum', and a limiter 57 for limiting the output power with the minimum value of the predicted output power Psum'.

The minimum detector 59 detects a minimum value of the predicted output power Psum' at each output power variation estimation time period Te. The limiter 57 limits the output power with the minimum value Psum' to have a constant total output power.

The computation is made at every output command cycle Tc with respect to the predicted output power for the output variation estimation period Te.

As mentioned above, the variation in the total output power can be predicted. As a result, a minimum value in the total output power for the output variation estimation period Te can be previously determined. Accordingly the minimum control can be previously started before the near future wind variation actually causes variation in the output power. The output variation estimation period Te is a near future predetermined time period in prediction time base currently used for the present prediction.

In the first embodiment, the minimum value of the predicted output Psum' is used. However, a target value other than the minimum value can be used if a battery 50, mentioned later, is coupled to the transmission line 9 (see FIG. 11). In this case, the target value can be increased from the minimum value Psum.

[Second Embodiment]

In the control method shown in FIGS. 8A and 8B, although variation in the output power is suppressed, a loss in energy becomes large because the control method does not allow the wind turbine generators to generate the output power more than the predicted output power Psum'. Then, will be described a control method according to a second embodiment of the present invention. The method is capable of increasing the total output power to be controlled at a constant value to an average Psum" of the total output power (see FIG. 6B) as a target value by reducing an energy loss by storing a wind energy as a rotation energy of the wind turbine generators. The central controller 41 further includes an averaging unit 58 which computes an average Psum" of the total output power (see FIG. 3B) at each output power variation estimation time period Te.

Figure 9A:
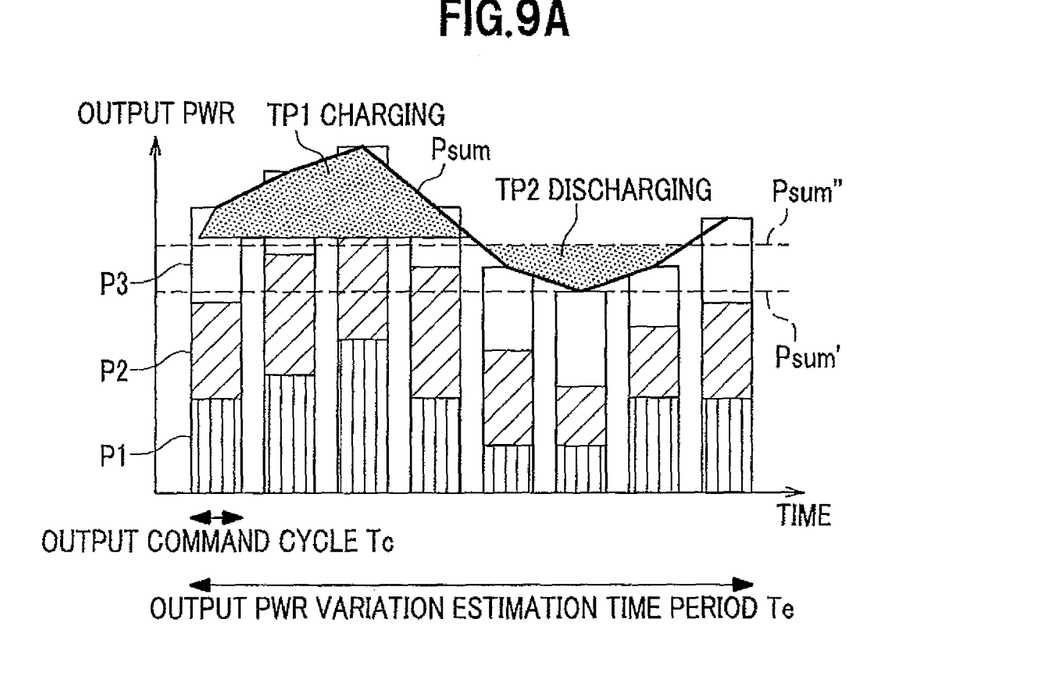
FIGS. 9A and 9B are charts for illustrating an operation of keeping a windfarm output constant by storing a wind energy as a rotation energy and discharging the rotation energy through a rotation frequency command to each wind turbine generator according to the second embodiment of the present invention.
Figure 9B:
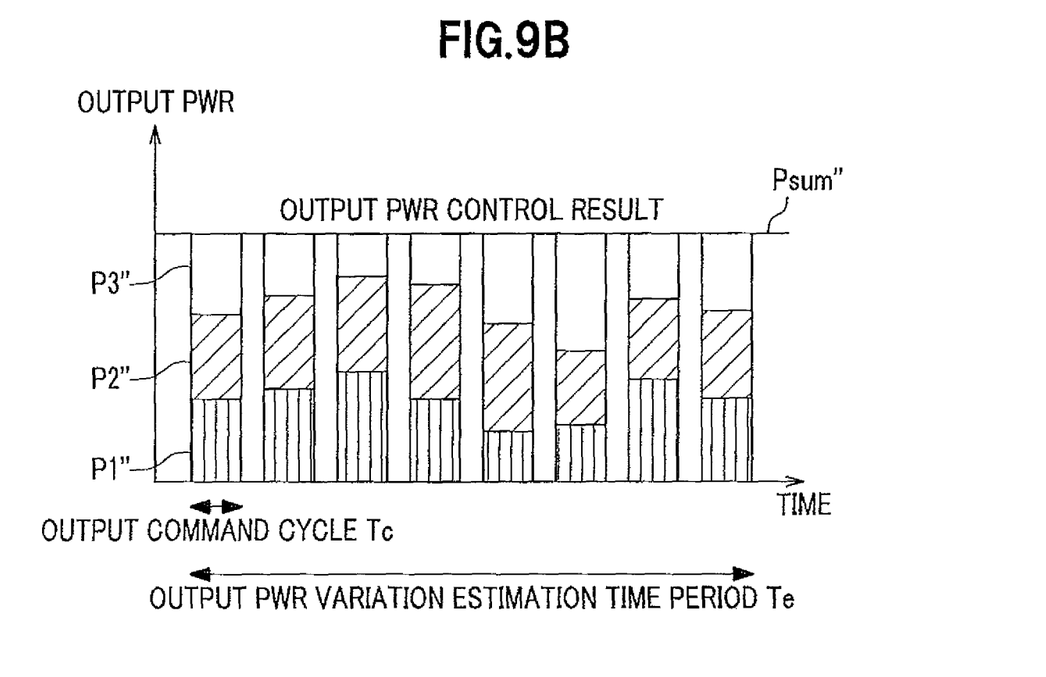
Figure 10:
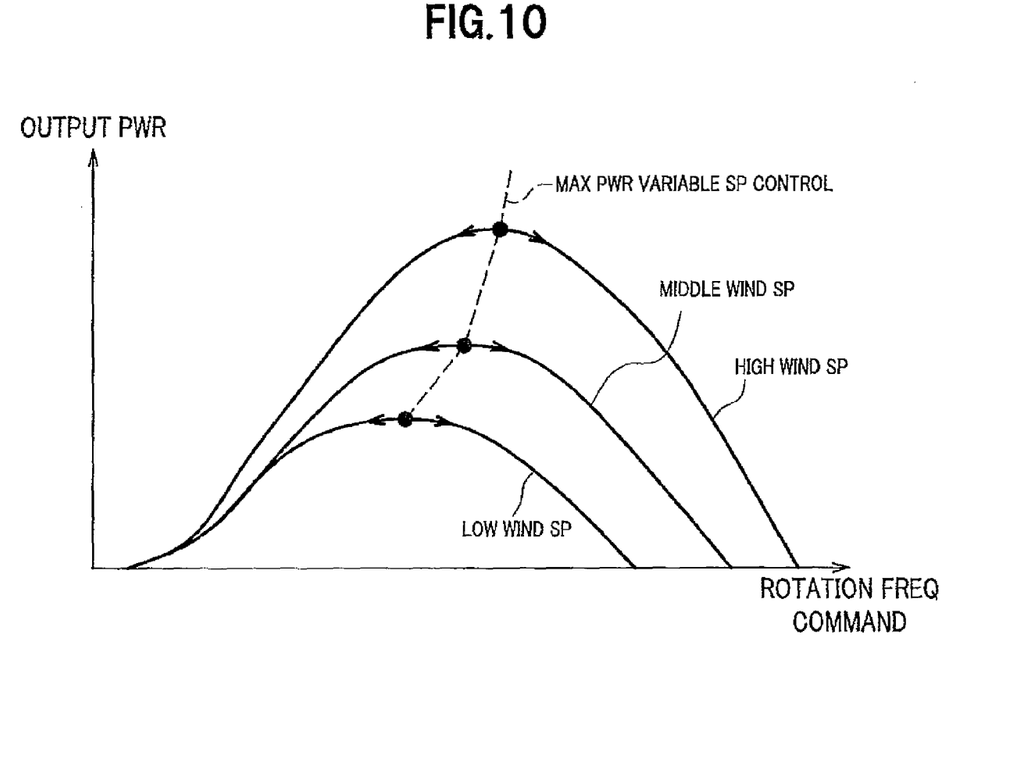
FIG. 10 is a chart of characteristics showing a relation between the rotation frequency command and output power according to the second embodiment of the present invention.

FIG. 9A shows variations in the output power P1 which will be measured, the predicted output powers P2, and P3 of the wind turbine generators 11 to 13, and a total predicted output power (P1+P2+P3) of the windfarm 100. FIG. 9B shows a result of an output power control at an output limitation at average Psum" with power charging (storing). FIG. 10 shows a rotation frequency-to-output characteristic of the wind turbine generators 11 to 13. In FIG. 10, in a variable speed control without charging energy as the rotation energy of the wind turbine generators 11 to 13, rotation frequency commands are determined at a rotation frequency with maximum output power (maximum power variable speed control) as shown by a broken line in FIG. 10. However, in the variable speed control with charging energy, the rotation frequency command is varied from that of the maximum output power as shown by arrows in FIG. 10.

In FIG. 9A, an average of a prediction output power Psum in an output power variation estimation time interval Te is determined as Psum". For a time period TP1 where the prediction output power Psum is greater than the average Psum" for the output power variation estimation time interval Te, the rotation frequency command is determined such that the rotation frequency is increased from the rotation frequency for the maximum output power as shown in FIG. 10 to reduce the output power and stores the wind energy as the rotation energy in the wind turbine generators.

On the other hand, for a time period TP2 where the prediction output power Psum is smaller than the average Psum", the rotation frequency command is determined to decrease the rotation frequency from the rotation frequency for the maximum output power to discharge the rotation energy as the output power to maintain the output power at the average Psum" as shown in FIG. 9B.

Figure 3B:
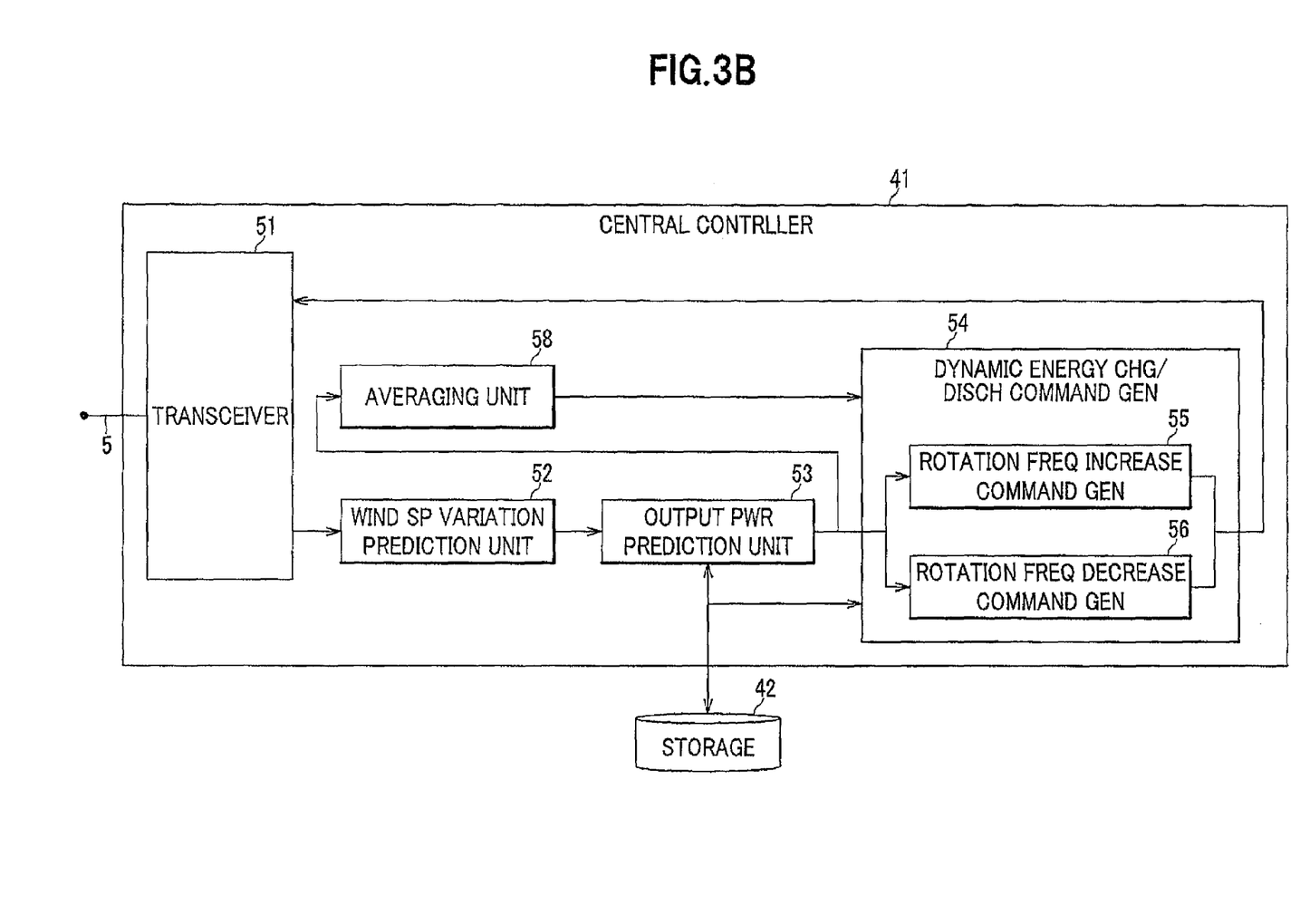
FIG. 3B is a block diagram of a central controller according to the second embodiment of the present invention.

FIG. 3B is a block diagram of the central controller 41. In FIG. 3B, the central controller 41 includes the transceiver 51 coupled to the communication network 5 for receiving the wind direction data, the wind speed data, and output data from the wind turbine generators 11 to 13 and transmitting commands to the wind turbine generators 11 to 13, a wind speed variation prediction unit 52 for receiving the wind direction data and the wind speed data and estimating (predicting) near future wind velocities within the windfarm 100 from the wind direction data and the wind speed data; the output power prediction unit 53 for receiving the wind direction data and the wind speed data and predicting (estimating) near future wind output power, a dynamic energy charging/discharging command generator 54 for generating a charge command and a discharge command to average output power of the windfarm 100, and averaging unit 58.

The transceiver 51 receives the wind direction data, the wind speed data, and output data from the wind turbine generators 11 to 13 and transmits commands to the wind turbine generators 11 to 13. The wind speed variation estimation unit 52 receives the wind direction data and the wind speed data and estimates (predicts) near future wind velocities within the windfarm 100 from the wind direction data and the wind variation data. The output estimation unit 53 receives near future wind velocities within the windfarm 100 and estimates (predicts) near future output power. The dynamic energy charging/discharging command generator 54 generates a charge command and a discharge command to average output power of the windfarm 100. More specifically, the dynamic energy charging/discharging command generator 54 includes a rotation frequency increase command generator 55 and a rotation frequency decrease command generator 56 and compares the output near future output power with the average Psum". When the near future output power is higher than the average Psum", the rotation frequency increase command generator 55 generates a command for increasing a rotation frequency of the wind turbine generator to charge the wind turbine generators 11 to 13 with the wind energy as a rotation energy in blades 14 and accompanied rotation mechanisms (wind mill) of the wind turbine generator 11.

When the near future output power is lower than the average Psum", the rotation frequency decrease command generator 56 generates a command for decreasing the rotation frequency of the wind turbine generator to discharge the rotation energy as an electric energy to average the output power of the windfarm 100.

The output characteristic data of each wind turbine generator stored in the storage 42 is supplied to the output estimation unit 53 and the dynamic energy charging/discharging command generator 54 and is used for output power estimation. The central controller and the local controllers are provided by control programs executed on computer systems. For example, different control programs are installed in computer units with the similar or same type configuration, respectively.

As mentioned above, the average Psum" can be predicted, so that the output power can be previously controlled before variation in the total output power can be predicted and efficiently controlled by charging the wind energy as rotation of the wind mill and discharging the rotation energy of the wind turbine generator as the electric power.

[Third Embodiment]

Figure 11:
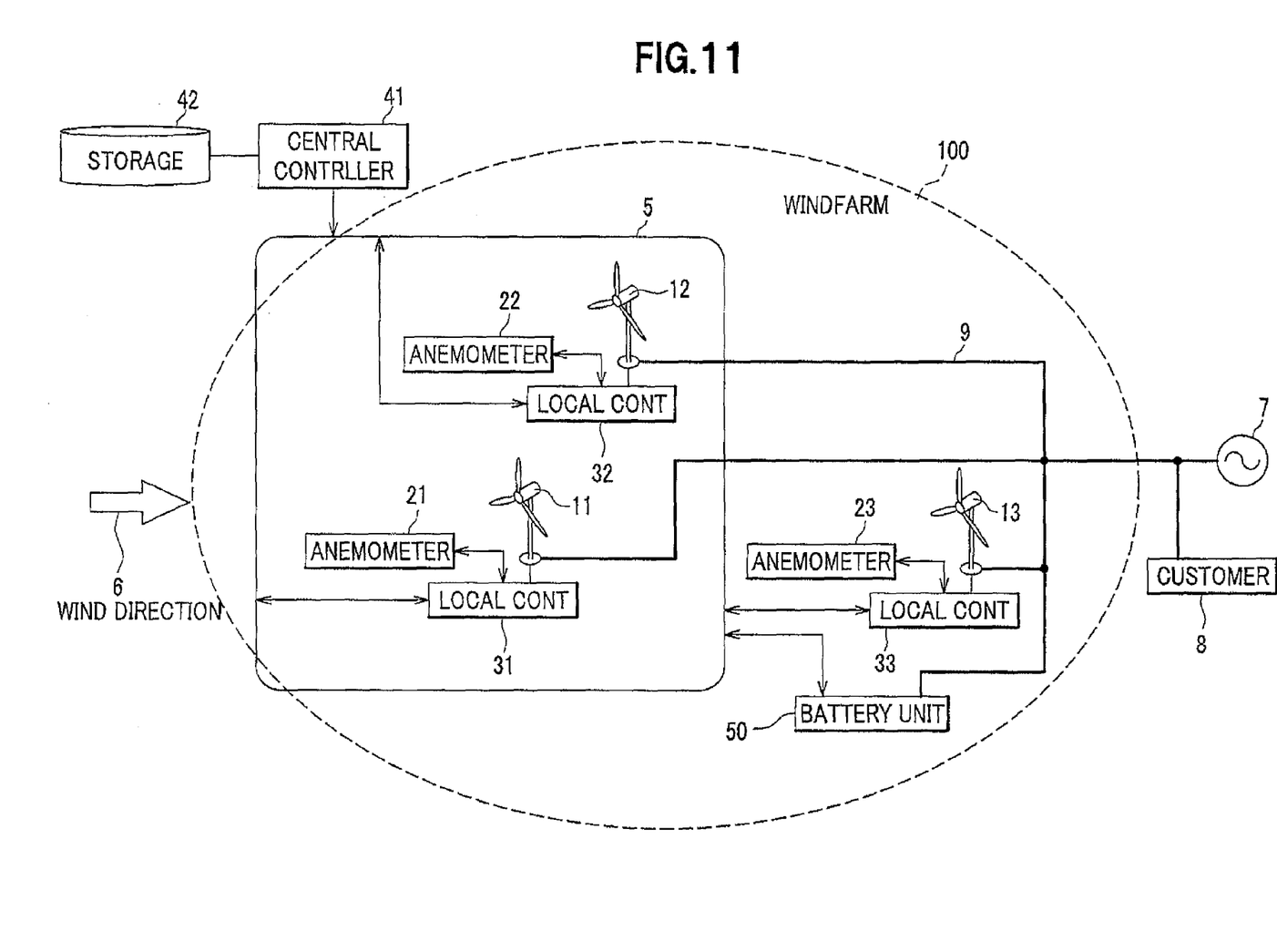
FIG. 11 is a block diagram of a windfarm according to a third embodiment including a battery in addition to the wind turbine generators.

FIG. 11 shows a windfarm with a battery unit 50 according to a third embodiment of the present invention.

The system includes the battery unit 50 in addition to the structure of the first and the second embodiment (the windfarm 100 and the central controller 41).

In the second embodiment, although the control is made to maintain the output power at the average output power Psum", there may be still an error in prediction of the wind velocity (wind speed). Thus, the battery unit 50 coupled to the central controller 41 through the network 5 is further provided. In the third embodiment, the output power in the transmission line 9 in the windfarm 100 is stored in the battery unit 50 and the stored energy is discharged to the transmission line 9 controlled toward the average Psum" in addition to varying the rotation frequency commands to the wind turbine generators 11 to 13 to control the output power toward the average Psum".

Accordingly, a basic part of controlling the output power is made by controlling the rotation frequency commands, and the battery unit 50 compensates the output power of the remaining part. This makes a capacity of the battery smaller than a system capable of only power control with a battery. This decreases a cost of the battery.

The battery unit 50 includes batteries (not shown) and a converter (not shown) for converting an AC power into a DC power for the batteries and converting the DC power in the batteries to an AC power for the transmission line 9 with synchronization with and voltage matching to the grid 50.

In the first to third embodiments, there are local controllers 31 to 33. However, the central controller 41 may directly control the wind turbine generators 11 to 13. The anemometers may directly transmit the data of the wind speed and the wind direction to the central controller 41.

[Fourth Embodiment]

Figure 12:
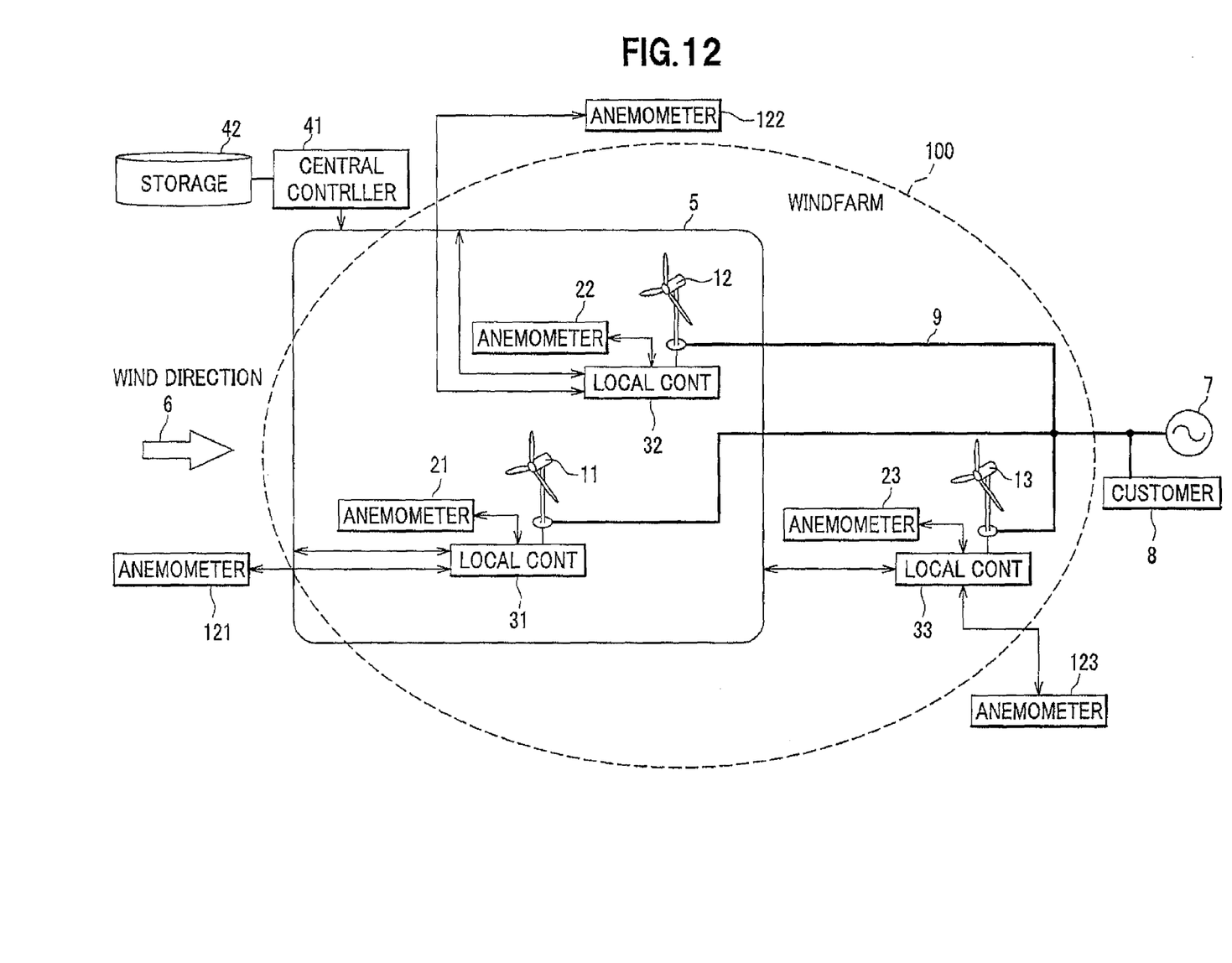
FIG. 12 is a block diagram of a windfarm including a controller according to the fourth embodiment of the present invention.

FIG. 12 is a block diagram of a windfarm according to a fourth embodiment. The structure of the windfarm according to the fourth embodiment is substantially the same as that of the first to third embodiment. The difference is in that the anemometers 121 to 123 are arranged outside the wind turbine generators 11 to 13. The wind speed of the wind turbine generator 11 can be also predicted with the anemometer 121 when wind blows in the wind direction 6.

In the first to third embodiments, the wind speed and wind direction at the wind turbine generator in the most upstream cannot be predicted. On the other hand, in the fourth embodiment, the wind speed and wind direction at the wind turbine generator in the most upstream can be predicted, so that a more accurate control is provided.

In the first to third embodiments, in the wind turbine generator in the most upstream position, the measured wind speed and wind direction or value at the near wind turbine generator are used as the prediction values. Accordingly, there is an error in prediction total values. However, if there are provided a sufficient number of wind turbine generators, an error in the predicted output power due to replacement value of the predicted value can be made sufficiently low. Therefore, the variation in the total output power can be detected previously.

As mentioned in the first to fourth embodiments, the central controller 41 predicts variation in the wind speed from the wind speed measured by the wind turbine generator in the most upstream position and controls the output power of the windfarm prior to large influence by the variation. Further, the mechanisms for the windmills (pitch, rotation frequency, and the like) with delay in response can be previously controlled.

The invention claimed is:

1. A controller for a wind farm including a plurality of wind turbine generators, the wind turbine generators being controllable in rotation frequency and pith of blades of the wind turbine generators, and the wind turbine generators coupled to a grid through a transmission line, the controller comprising:
    a plurality of anemometers, each disposed at a wind turbine generator, the anemometers configured to measure wind directions and wind speeds at the wind turbine generators;
    a plurality of local controllers, each disposed at a wind turbine generator, the local controllers configured to transmit operation information, including the measured data wind directions and wind speeds, through a communication network, to receive output commends, and to respectively control each wind turbine generator; and
    a central controller configured to receive the operation information from the local controllers through the communication network, to compute variation in output power of the wind turbine generates on the basis of the received operation information, and to generate and to transmit output commends to the local controllers to control the wind turbine generators on the basis of the computed variation;
    wherein each of the wind turbine generators is individually controlled based on wind speed variation thereof; and
    wherein when controlling the wind turbine generators to generate a predetermined constant power output from the wind farm, and when a combined power output from all wind turbine generators is less than the constant power output, then a wind turbine generator having a relatively higher reserve capacity than other wind turbine generators is controlled to take a relatively higher portion of the combined power output.

2. The controller as claimed in claim 1, wherein the central controller includes:
    a transceiver configured to receive the operation information from the local controllers;
    a wind speed prediction unit configured to predict near future wind speed variation at the wind farm on the basis of the received operation information;
    an output power prediction unit configured to predict near future output power of the wind farm on the basis of the predicted near future wind speeds;
    a detector configured to detect a target value of the predicted near future output power of the wind farm; and
    a limiter configured to limit an output power of the wind farm, by using the detected target, wherein the limiter starts the limitation of the output power before the near future wind variation actually causes variation in the output power.

3. The controller as claimed in claim 1, wherein the central controller includes:
    a transceiver configured to receive the operation information from the local controllers;
    a wind speed prediction unit configured to predict near future wind speed variation at the wind farm on the basis of the received operation information;
    an output power prediction unit configured to predict near future output power of the wind farm on the basis of the predicted near future wind speeds; and
    a dynamic energy charging unit configured to charge the wind turbines with wind energy as rotation energy when a total of the near future output power becomes larger than a target value and discharges the rotation energy as an output power of the wind farm when the total becomes smaller than the target value to keep the output of the wind farm constant.

4. The controller as claimed in claim 3, wherein the dynamic energy storing unit includes:
    a rotation frequency increasing unit configured to generate and transmit a rotation frequency increasing command as the output command to the wind turbine generations to store the wind energy as rotation energy at the wind turbines when the total output power of the wind farm is larger than a target value; and
    a rotation frequency decreasing unit configured to generate and transmit a rotation frequency decreasing command as the output command to the wind turbine generations to discharge the rotation energy as the output power of the wind farm when the total output power of the wind farm is smaller than the target value.

5. The controller as claimed in claim 3, further comprising:
    a battery unit coupled to the transmission line and configured to, when the central controller controls the output power of the wind farm with the dynamic energy storing unit, obtain a difference between the target and the output power of the wind farm, controls the battery unit to store the output power in the battery as stored energy and discharge the stored energy as an electric energy on the basis of the difference to compensate the output power.

6. The controller as claimed in claim 1, wherein the central controller includes the same hardware as the local controller, but different control software than the local controller.

7. The controller as claimed in claim 1,
    wherein when controlling the wind turbine generators to generate a predetermined constant power output from the wind farm, and when a combined power output from all wind turbine generators is greater than the constant power output, then one or more wind turbine generators are controlled to produce less power output so as to produce the constant power output, without stopping any of the wind turbine generators.

8. The controller as claimed in claim 1,
wherein when controlling the wind turbine generators to generate a predetermined constant power output from the wind farm, each wind turbine generator is controlled to produce approximately the same power output as the others.

9. A control method for a wind farm, the wind farm including a plurality of wind turbine generators, the wind turbine generators being controllable in rotation frequency and pith of wind mills of the wind turbine generators, and the wind farm coupled to a grid through a transmission line, the control method comprising:
receiving operation information from a plurality of local controllers, each local controller provided at a wind turbine generator;
computing an output power variation of the wind farm; and
generating output commands to control the wind farm, on the basis of the computed output power variation, and transmitting the output commands to the wind farm;
wherein an output command individually controls a wind turbine generator based on the wind speed variation thereof; and
wherein when controlling the wind turbine generators to generate a predetermined constant power output from the wind farm, and when a combined power output from all wind turbine generators is less than the constant power output, then a wind turbine generator having a relatively higher reserve capacity than other wind turbine generators is controlled to take a relatively higher portion of the combined power output.

10. The control method as claimed in claim 9, further comprising:
receiving operation information transmitted from each wind turbine generator;
predicting near future wind speed variation at the wind farm, on the basis of the received operation information;
predicting near future output variation of the wind farm on the basis of the predicted near future wind speed variation; and
storing wind energy as rotation energy in the wind farm by at least one of the wind turbines when a total of the near future output power is larger than a target value and discharges the rotation energy as an output power of the wind farm when the total is smaller than the target value to keep the output of the wind farm constant.

11. The control method as claimed in claim 9,
wherein when controlling the wind turbine generators to generate a predetermined constant power output from the wind farm, and when a combined power output from all wind turbine generators is greater than the constant power output, then one or more wind turbine generators are controlled to produce less power output so as to produce the constant power output, without stopping any of the wind turbine generators.

12. The control method as claimed in claim 9,
wherein when controlling the wind turbine generators to generate a predetermined constant power output from the wind farm, each wind turbine generator is controlled to produce approximately the same power output as the others.

13. A controller for a wind farm including a plurality of wind turbine generators, the wind turbine generators being controllable in rotation frequency and pith of wind mills of the wind turbine generators, and the wind turbine generators coupled to a grid through a transmission line, the controller comprising:
a central controller; and
a plurality of anemometers disposed at the wind turbine generators, configured to measure wind directions and wind speeds thereat, and coupled to the central controller in order to transmit data of the wind directions and wind speeds to the central controller;
wherein the central controller is configured to predict variation in output power of the wind turbine generators, on the basis of the data of wind directions and wind speeds and locations of the wind turbine generators, and to individually control each of the wind turbine generators, by using the predicted variation in the output power of each respective wind turbine generator;
wherein when controlling the wind turbine generators to generate a predetermined constant power output from the wind farm, and when a combined power output from all wind turbine generators is less than the constant power output, then a wind turbine generator having a relatively higher reserve capacity than other wind turbine generators is controlled to take a relatively higher portion of the combined power output.

14. The controller as claimed in claim 13, wherein the central controller includes:
a wind speed prediction unit, configured to predict near future wind speeds at the wind turbine generators on the basis of the measured wind directions and the wind speeds;
an output power prediction unit configured to predict near future output powers of the wind turbine generators on the basis of the predicted near future wind speeds; and
dynamic energy storing unit configured to store wind energy as rotation energy at the wind turbines when a total of the predicted output power of the wind farm is larger than a target and discharges the rotation energy as an output power of the wind turbine generators when the total of the predicted output power of the wind farm is smaller than the target value to maintain the output of the wind farm.

15. The controller as claimed in claim 14, further comprising an averaging unit configured to average the output power for a predetermined time period as the target value.

16. The controller as claimed in claim 14, wherein the dynamic energy storing unit further includes:
a rotation frequency increasing unit configured to increase rotation frequencies of the wind turbines to store the wind energy as rotation energy at the wind turbines when the total output power of the wind farm is larger than the target value; and
a rotation frequency decreasing unit configured to decrease the rotation frequency of the wind turbine generations to discharges the rotation energy as the output power of the wind turbine generators when the total output power of the wind farm is smaller than the target value to maintain the output of the wind farm.

17. The controller as claimed in claim 14, further comprising:
a battery unit coupled to the transmission line, wherein the central controller controls rotation speeds of the wind turbine generators on the basis of predicted output powers of the wind turbine generators, obtains a difference between the target and measured output powers, controls the battery unit charge the battery with energy from the output power and cause the battery to discharge the stored energy to compensates the output power.

18. The controller as claimed in claim 13,
wherein when controlling the wind turbine generators to generate a predetermined constant power output from the wind farm, and when a combined power output from all wind turbine generators is greater than the constant power output, then one or more wind turbine generators are controlled to produce less power output so as to produce the constant power output, without stopping any of the wind turbine generators.

19. The controller as claimed in claim 13,
wherein when controlling the wind turbine generators to generate a predetermined constant power output from the wind farm, each wind turbine generator is controlled to produce approximately the same power output as the others.

* * * * *